United States Patent

Sakamoto et al.

(10) Patent No.: US 6,753,398 B2
(45) Date of Patent: Jun. 22, 2004

(54) ROOM TEMPERATURE CURABLE COMPOSITIONS

(75) Inventors: Takafumi Sakamoto, Gunma-ken (JP); Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/067,856

(22) Filed: Feb. 8, 2002

(65) Prior Publication Data

US 2002/0137869 A1 Sep. 26, 2002

(30) Foreign Application Priority Data

Feb. 9, 2001 (JP) ..................................... 2001-034340

(51) Int. Cl.⁷ ............................................. C08G 77/52
(52) U.S. Cl. ........................... 528/12; 528/21; 528/35; 524/490
(58) Field of Search ....................... 528/12, 21, 35, 528/43; 524/490

(56) References Cited

U.S. PATENT DOCUMENTS

| | | | | |
|---|---|---|---|---|
| 4,904,732 A | * | 2/1990 | Iwahara et al. | 525/100 |
| 5,045,395 A | | 9/1991 | Podszun | |
| 5,319,050 A | * | 6/1994 | Kimura et al. | 528/12 |
| 5,424,383 A | * | 6/1995 | Kimura et al. | 528/12 |
| 5,705,591 A | * | 1/1998 | Matsuda et al. | 528/42 |
| 6,306,998 B1 | * | 10/2001 | Kimura et al. | 528/12 |

FOREIGN PATENT DOCUMENTS

| | | | |
|---|---|---|---|
| DE | 40 16 999 A | 11/1991 |
| EP | 0 417 539 A | 3/1991 |
| EP | 0 525 863 A | 2/1993 |
| EP | 0 566 272 A | 10/1993 |
| EP | 0 839 864 A | 5/1998 |
| EP | 0 890 594 A | 1/1999 |
| GB | 855 009 A | 11/1960 |
| JP | 11-209701 A | 8/1999 |

OTHER PUBLICATIONS

Database WPI Section Ch, Week 199941, Derwent Publications Ltd., London, GB; AN 1999–489001, XP002200590.

Database WPI Section Ch, Week 200061, Derwent Publications Ltd., London, GB; AN 2000–631609, XP002200591.

* cited by examiner

*Primary Examiner*—Margaret G. Moore
*Assistant Examiner*—Marc S. Zimmer
(74) *Attorney, Agent, or Firm*—Birch, Stewart, Kolasch & Birch, LLP

(57) ABSTRACT

A composition comprising (A) a saturated hydrocarbon polymer having a number average molecular weight in the range of 500–50,000 and bearing at least two hydrolyzable silyl groups at an end of the backbone and/or an end of a side chain per molecule, (B) an organic compound having at least one C=O group in a molecule, and (C) an organic compound having at least one $NH_2$ group in a molecule, the C=O group and the $NH_2$ group being reactive with each other, is improved in room temperature curing, especially in fast curing and deep curing.

8 Claims, No Drawings

ROOM TEMPERATURE CURABLE COMPOSITIONS

This invention relates to room temperature curable compositions, and more particularly, to room temperature curable compositions of the condensation curing type having fast curing and deep curing capabilities.

BACKGROUND OF THE INVENTION

Nowadays elastic sealing materials are widely employed in a variety of applications, typically in buildings and automobiles. On use, sealing materials are filled in joints and gaps between various members for forming water- and gas-tight seals. The sealing materials are therefore required, after being filled in joints or around window frames, to quickly cure and form a firm bond to various substrates, typically of inorganic materials such as glass, ceramics, metals, cement and mortar and organic materials such as plastics.

Room temperature fast curable saturated hydrocarbon polymer compositions are known effective as the sealing material. For improving the adhesion of such compositions, a primer composition and a bonding method have been proposed as disclosed in JP-A 11-209701. However, these compositions are not satisfactory in curing capability and a need exists for further improvements in curing performance.

SUMMARY OF THE INVENTION

An object of the invention is to provide a room temperature fast curable composition of the condensation curing type which is improved in curability, especially in fast curing at room temperature and curing to depth.

It has been found that blending (A) a saturated hydrocarbon polymer having a number average molecular weight in the range of 500 to 50,000 and bearing at least two hydrolyzable silyl groups at an end of the backbone and/or an end of a side chain per molecule, with (B) an organic compound having at least one C=O group in a molecule, and (C) an organic compound having at least one $NH_2$ group in a molecule, the C=O group in component (B) and the $NH_2$ group in component (C) being selected so as to be reactive with each other, leads to a room temperature fast curable composition of the condensation curing type which is improved in both fast curing at room temperature and curing to depth.

Room temperature fast curable organopolysiloxane compositions of the condensation curing type known in the art include compositions of one part type comprising a both end hydroxy-terminated organopolysiloxane as a base polymer and a crosslinking agent in an amount minimized so as to increase the rate of crosslinking through hydrolysis, and compositions of two part type wherein a both end hydroxy-terminated organopolysiloxane as a base polymer and a crosslinking agent are separately packed.

The compositions of one part type, however, are not regarded as fast curing since they merely have a high curing rate from the surface and require a certain time for deep curing. By contrast, the compositions of two part type are relatively fast in depth curing, but are difficult to handle on account of a mixing ratio of the two parts departing from 1:1 and thus inapplicable to an automatic mixing dispenser. In order to drive complete curing to depths, the quantity of hydroxyl at both ends of organopolysiloxane or polyoxyalkylene polymer and the quantity of crosslinking agent added must be strictly controlled, or water must be further added as a deep curing agent.

On the other hand, organopolysiloxane compositions of the addition curing type are efficient to work since the two parts are mixed in a ratio of 1:1. However, the working environment is limited since a heating oven is generally necessary for curing and the curing catalyst can be poisoned in the presence of an addition poison.

To solve these problems, we proposed in JP-A 5-279570 a composition comprising a diorganopolysiloxane or polyoxyalkylene as a base polymer, an organic compound having a double bond in the form of a C=O group and an organic compound having a $NH_2$ group wherein instead of directly adding water necessary for condensation curing, water is generated within the composition by reaction between the organic compounds. The composition is improved in deep curing and fast curing properties. However, the silicone base compositions are less stain resistant as the sealing agent, and the polyether base compositions are insufficient in durability and curability. Where saturated hydrocarbon polymers are used, stain resistance is good, but curability is very low as compared with silicone base compositions.

Continuing investigations, we have found that in the composition comprising the saturated hydrocarbon polymer (A), organic compound (B) and organic compound (C), crosslinking reaction takes place between a hydrolyzable silyl group at an end of the backbone and/or a side chain of the saturated hydrocarbon polymer (A) and air-borne moisture, and in parallel therewith, dehydration condensation reaction takes place between compound (B) and compound (C) according to the following scheme (I):

$$R_2C=O+H_2NR' \rightarrow R_2C=NR'+H_2O \tag{I}$$

wherein R and R' are organic groups, allowing crosslinking reaction to proceed with the water generated in depth within the composition as well. As a result, the inventive composition is improved in fast curing and also drastically improved in deep curing. Additionally, the composition has good stain resistance and durability.

This also overcomes the problems of water separation and a decline of workability due to increased thixotropy as found in prior art compositions wherein water is added as a deep curing agent. The present invention is predicated on these findings.

Accordingly, the invention provides a room temperature curable composition comprising (A) 100 parts by weight of a saturated hydrocarbon polymer having a number average molecular weight in the range of 500 to 50,000 and bearing at least two hydrolyzable silyl groups at an end of the backbone and/or an end of a side chain per molecule, (B) an organic compound having at least one C=O group in a molecule, in such an amount as to give 0.001 to 1 mol of the C=O group per 100 parts by weight of polymer (A), and (C) an organic compound having at least one $NH_2$ group in a molecule, in such an amount as to give 0.001 to 1 mol of the $NH_2$ group per 100 parts by weight of polymer (A), components (B) and (C) being selected such that the C=O and $NH_2$ groups in the respective components are reactive with each other.

DESCRIPTION OF THE PREFERRED EMBODIMENTS

Component (A)

Component (A) is a base polymer. Any of saturated hydrocarbon polymers excluding polyether polymers is used. The saturated hydrocarbon polymer must have at least two hydrolyzable silyl groups at an end of the backbone and/or an end of a side chain per molecule. Owing to the presence of hydrolyzable silyl groups, the base polymer undergoes hydrolysis and polycondensation in the presence of air-borne moisture and water generated by reaction of components (B) and (C) to be described later, forming a cured product of rubber elastomer.

The hydrolyzable silyl group is defined as a silicon atom having at least one hydrolyzable group attached thereto and represented by the following formula.

Herein X is a hydrolyzable group, p is an integer of 1 to 3, and $R^1$ is a substituted or unsubstituted monovalent hydrocarbon group. Examples of the hydrolyzable group (X) include carboxyl, ketoxime, alkoxy, alkenoxy, amino, aminoxy, and amide groups. The hydrolyzable group attached to a single silicon atom is not limited to one, and two or three hydrolyzable groups may be attached to a common silicon atom. Another organic group or groups may, of course, be attached to the silicon atom having the hydrolyzable group or groups attached thereto. Examples of the organic groups ($R^1$) include alkyl groups such as methyl, ethyl and propyl, cycloalkyl groups such as cyclohexyl, alkenyl groups such as vinyl and allyl, aryl groups such as phenyl and tolyl, and substituted ones of the foregoing groups in which some hydrogen atoms are replaced by halogen atoms or the like, such as chloromethyl and 3,3,3-trifluoropropyl.

The base polymer (A) should have a number average molecular weight in the range of 500 to 50,000. Outside the range, there arise inconvenient problems including difficulty to form a cured rubber having satisfactory properties and inefficient working.

The base polymer is not critical as long as it is selected from saturated hydrocarbon polymers such as ethylene polymers, propylene polymers and isobutylene polymers. Preferably the polymer (A) has in its backbone a structure of the following general formula (1):

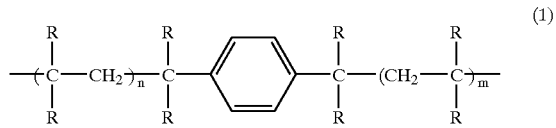

wherein R, which may be the same or different, is a substituted or unsubstituted monovalent hydrocarbon group, m and n are positive integers such that the polymer has a number average molecular weight in the range of 500 to 50,000. More preferably the polymer (A) has the following general formula (2):

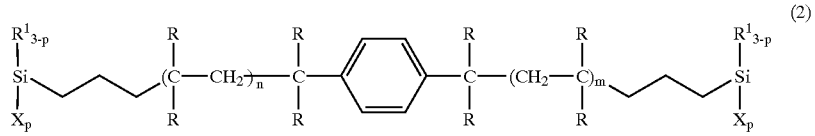

wherein R and $R^1$, which may be the same or different, are substituted or unsubstituted monovalent hydrocarbon groups, X is a hydrolyzable group as defined above, p is an integer of 1 to 3, preferably 2 or 3, and m and n are positive integers as defined above. Examples of the group R are the same as the organic groups ($R^1$), other than the hydrolyzable groups, enumerated above in connection with the hydrolyzable silyl groups. Letters m and n are such that the unsaturated hydrocarbon polymer has a number average molecular weight within the above-defined range.

Component (B)

Component (B) is an organic compound having at least one C=O group in a molecule, which reacts with an organic compound having at least one $NH_2$ group in a molecule as component (C) to produce water serving as a curing agent in the deep interior of the composition.

Any desired organic compound may be used as long as it has a carbonyl (C=O) group capable of reaction as shown by scheme (I). Examples include ketones such as acetone, methyl ethyl ketone, and acetophenone, esters such as ethyl acetate, butyl acetate, methyl propionate, ethyl acrylate and butyrolactone, amides such as dimethylformamide, diethylacetamide, and butyrolactam, carboxylic acids such as acetic acid, propionic acid, and benzoic acid, silane coupling agents having the foregoing as a functional group, and oligomers and polymers having C=O groups. Among others, ketones are especially preferred. Preferred from the standpoint of steric hindrance during reaction with component (C) is a compound in which the carbon atom at α-position relative to the carbonyl group is primary, secondary or a part of an aromatic ring. If the carbon atom at α-position is a tertiary carbon atom as usual, reactivity with an amino group may be low, with a failure to achieve the desired cure. These compounds may be used alone or in admixture of two or more.

The amount of component (B) blended is to give 0.001 to 1 mol and preferably 0.01 to 0.1 mol of the carbonyl (C=O) group per 100 parts by weight of component (A). Less amounts of component (B) fail to achieve satisfactory deep curing whereas excessive amounts of component (B) result in cured elastomers which will not exhibit the desired physical properties.

Component (C)

Component (C) is an organic compound having at least one $NH_2$ group, which reacts with component (B) to produce water serving as a curing agent in the deep interior of the composition as described above.

Any desired organic compound may be used as long as it has a reactive amino ($NH_2$) group capable of reaction as shown by scheme (I). Examples include amines such as methylamine, ethylamine, butylamine, ethylenediamine, and aniline; silane coupling agents having $NH_2$ as a functional group such as γ-aminopropyltriethoxysilane, and oligomers and polymers having $NH_2$ groups. From the standpoint of steric hindrance during reaction with component (B), component (C) is preferably an organic compound in which the carbon atom at α-position relative to the amino group is primary, secondary or a part of an aromatic ring. If the carbon atom at α-position is a tertiary carbon atom as usual, then the amino group in component (C) may become less reactive with the carbonyl group in component (B), sometimes failing to achieve the desired effect. These compounds may be used alone or in admixture of two or more.

The amount of component (C) blended is to give 0.001 to 1 mol and preferably 0.01 to 0.1 mol of the amino (NH$_2$) group per 100 parts by weight of component (A). Less amounts of component (C) fail to achieve satisfactory deep curing whereas excessive amounts of component (C) result in cured elastomers which will not exhibit the desired physical properties.

Components (B) and (C) are preferably blended such that the molar ratio of C=O to NH$_2$ may range from 1/10 to 10/1, especially from 1/5 to 5/1.

Other Components

In addition to the foregoing essential components (A) to (C), various other addenda may be added to the composition of the invention insofar as they do not adversely affect the fast curing and deep curing at room temperature. Since it is crucial for the invention that components (B) and (C) react to form water serving as a deep curing agent as seen from scheme (I), organic compounds are, of course, selected for components (B) and (C) so that this type of reaction may instantaneously take place, and various addenda which are optional must be selected so as not to inhibit the formation of water.

As a typical addendum, it is preferred to blend in the composition a hydrocarbon plasticizer (D) such as paraffinic process oil. The hydrocarbon plasticizer is preferably blended in amounts of 5 to 200 parts, especially 10 to 100 parts by weight per 100 parts by weight of component (A).

Other exemplary addenda include condensation catalysts such as organic tin esters, organic titanate esters, tetramethylguanidylpropyltrimethoxysilane; storage stabilizers such as methyltrimethoxysilane, methyltripropenoxysilane, vinyltributanoximesilane and methyltriacetoxysilane; and reinforcing fillers such as fumed silica, precipitated silica, quartz flour, titanium oxide, aluminum oxide, carbon powder, bentonite, wood chips, pulp, cotton chips, asbestos, glass fibers, carbon fibers, mica, ground walnut shell, ground chaff, graphite, diatomaceous earth, terra abla, silicic anhydride, carbon black, calcium carbonate, clay, talc, magnesium carbonate, aluminum fine powder, print powder and zinc powder. Of these fillers, precipitated silica, fumed silica, carbon black, calcium carbonate, titanium oxide and talc are preferred. Also included are radical inhibitors and antiozonants, for example, phenolic antioxidants, aromatic amine antioxidants, sulfurous hydroperoxide decomposers, phosphorous hydroperoxide decomposers, benzotriazole UV absorbers, salicylate UV absorbers, benzophenone UV absorbers, hindered amine photo-stabilizers, and nickel photo-stabilizers. Further included are fibrous fillers such as asbestos, glass fibers and organic fibers; coloring agents such as pigments and dyes; heat resistance modifiers such as red iron oxide and cerium oxide; freeze resistance modifiers; dehydrating agents; rust-preventing agents; tackifiers such as γ-glycidoxy-propyltriethoxysilane; liquid reinforcing agents such as a network polysiloxane consisting of triorganosiloxy units and SiO$_2$ units; metal inactivating agents, lubricants, pigments and foaming agents. These addenda may be used in conventional amounts.

Curable Composition

The composition of the invention can be formulated as a room temperature fast curable composition of one part type by uniformly mixing predetermined amounts of components (A) to (C) and optional components and in a dry or anhydrous atmosphere if necessary. To insure shelf stability, component (B) or (C) may be microcapsulated prior to blending into a room temperature fast curable composition of one part type.

Alternatively, the composition of the invention can be formulated as a two part type wherein the two parts are mixed on use. In one example, one part is composed of components (A) and (B) and the other part is composed of components (A) and (C). In these examples, the two parts can be mixed in a ratio of 1:1.

The inventive composition thus obtained will cure in the presence of moisture in air. During the process, water forms at depths to induce curing thereat. Both curing from the surface and curing at depths take place at the same time, facilitating fast curing and deep curing.

When the inventive composition is formulated as a two part package whereupon the two parts are mixed on use, the mixing step is very easy on account of the mixing ratio of 1:1. Furthermore, the respective components are readily available. Thus the invention is of great worth in practical application.

Because of the fast curing and deep curing advantages as well as stain resistance and durability, the inventive composition is very suitable as automobile oil seal material and also useful as sealing agents and potting agents in electric and electronic applications where simple, efficient steps are strongly demanded for manufacture.

EXAMPLE

Examples of the invention are given below by way of illustration and not by way of limitation. Note that the viscosity is a measurement at 23° C., Mn is number average molecular weight, Mw is weight average molecular weight, and Me is methyl.

Comparative Example 1

A curable composition was prepared by mixing under anhydrous conditions 150 g of a mixture of a saturated hydrocarbon polymer of formula (3) below (Mn =5,800, Mw/Mn=1.21) and a paraffinic process oil (trade name Diana Process PS-32 by Idemitsu Industries, Ltd.) as a hydrocarbon plasticizer in a weight ratio of 2:1, 3.0 g of dibutyltin dilaurate, 75 g of colloidal light calcium carbonate (trade name MT-100 by Maruo Calcium K.K.), 75 g of heavy calcium carbonate (trade name Softon 1500 by Shiraishi Calcium K.K.), and 10 g of fumed silica (trade name Aerosil R-972 by Nippon Aerosil Co., Ltd.).

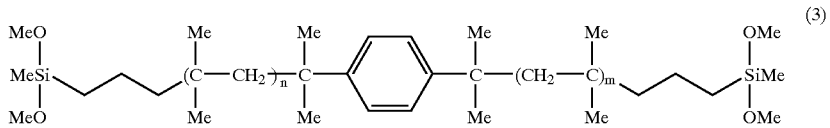

(3)

The composition was worked into a sheet of 2 mm thick, which was allowed to stand in an atmosphere of 23° C. and RH 50% for one hour. The resulting rubber elastomer was examined for physical properties (hardness, elongation and tensile strength) according to JIS K-6249. The results are shown in Table 1. Separately, the composition was cast into a glass cylinder having a diameter of 20 mm and a length of 100 mm and allowed to cure in an atmosphere of 23° C. and RH 50% for 24 hours. At the end of curing, the cured product was taken out by breaking the glass cylinder. The thickness of a rubbery elastomer portion was measured to be 0.5 mm.

Example 1

A curable composition was prepared by mixing under anhydrous conditions 150 g of a mixture of a saturated hydrocarbon polymer of formula (3) (Mn =5,800, Mw/Mn =1.21) and a paraffinic process oil (trade name Diana Process PS-32 by Idemitsu Industries, Ltd.) as a hydrocarbon plasticizer in a weight ratio of 2:1, 75 g of colloidal light calcium carbonate (trade name MT-100 by Maruo Calcium K.K.), 75 g of heavy calcium carbonate (trade name Softon 1500 by Shiraishi Calcium K.K.), 10 g of fumed silica (trade name Aerosil R-972 by Nippon Aerosil Co., Ltd.), 2.90 g (0.05 mol) of acetone, 6.45 g (0.05 mol) of n-butylamine, and 3.0 g of dibutyltin dilaurate.

Rubber properties of this composition were examined as in Comparative Example 1, with the results shown in Table 1. Also as in Comparative Example 1, the composition was cured in a glass cylinder, and the thickness of a rubbery elastomer portion was measured to be 100 mm. It is thus evident that the composition within the scope of the invention is good in deep curing.

Comparative Example 2

A curable composition was prepared by mixing under anhydrous conditions 150 g of a mixture of a saturated hydrocarbon polymer of formula (4) below (Mn=5,800, Mw/Mn=1.21) and a paraffinic process oil (trade name Diana Process PS-32 by Idemitsu Industries, Ltd.) as a hydrocarbon plasticizer in a weight ratio of 2:1, 1.0 g of tetramethylguanidylpropyltrimethoxysilane, 75 g of colloidal light calcium carbonate (trade name MT-100 by Maruo Calcium K.K.), 75 g of heavy calcium carbonate (trade name Softon 1500 by Shiraishi Calcium K.K.), and 10 g of fumed silica (trade name Aerosil R-972 by Nippon Aerosil Co., Ltd.).

Rubber properties of this composition were examined as in Comparative Example 1, with the results shown in Table 1.

Example 2

A curable composition was prepared by mixing under anhydrous conditions 150 g of a mixture of a saturated hydrocarbon polymer of formula (4) (Mn=5,800, Mw/Mn 1.21) and a paraffinic process oil (trade name Diana Process PS-32 by Idemitsu Industries, Ltd.) as a hydrocarbon plasticizer in a weight ratio of 2:1, 2.90 g (0.05 mol) of acetone, 11.05 g (0.05 mol) of γ-aminopropyltriethoxysilane, 1.0 g of tetramethylguanidylpropyltrimethoxysilane, 75 g of colloidal light calcium carbonate (trade name MT-100 by Maruo Calcium K.K.), 75 g of heavy calcium carbonate (trade name Softon 1500 by Shiraishi Calcium K.K.), and 10 g of fumed silica (trade name Aerosil R-972 by Nippon Aerosil Co., Ltd.).

Rubber properties of this composition were examined as in Comparative Example 1, with the results shown in Table 1.

Comparative Example 3

A curable composition was prepared by mixing under anhydrous conditions 150 g of a mixture of a saturated hydrocarbon polymer of formula (4) (Mn=11,000, Mw/Mn=1.45) and a paraffinic process oil (trade name Diana Process PS-32 by Idemitsu Industries, Ltd.) as a hydrocarbon plasticizer in a weight ratio of 2:1, 1.0 g of tetramethylguanidylpropyltrimethoxysilane, 75 g of colloidal light calcium carbonate (trade name MT-100 by Maruo Calcium K.K.), 75 g of heavy calcium carbonate (trade name Softon 1500 by Shiraishi Calcium K.K.), and 10 g of fumed silica (trade name Aerosil R-972 by Nippon Aerosil Co., Ltd.).

Rubber properties of this composition were examined as in Comparative Example 1, with the results shown in Table 1.

Example 3

A curable composition was prepared by mixing under anhydrous conditions 150 g of a mixture of a saturated hydrocarbon polymer of formula (4) (Mn=11,000, Mw/Mn=1.45) and a paraffinic process oil (trade name Diana Process PS-32 by Idemitsu Industries, Ltd.) as a hydrocarbon plasticizer in a weight ratio of 2:1, 2.90 g (0.05 mol) of acetone, 11.05 g (0.05 mol) of γ-aminopropyltriethoxysilane, 1.0 g of tetramethylguanidylpropyltrimethoxysilane, 75 g of colloidal light calcium carbonate (trade name MT-100 by Maruo Calcium K.K.), 75 g of heavy calcium carbonate (trade name Softon 1500 by Shiraishi Calcium K.K.), and 10 g of fumed silica (trade name Aerosil R-972 by Nippon Aerosil Co., Ltd.).

Rubber properties of this composition were examined as in Comparative Example 1, with the results shown in Table 1.

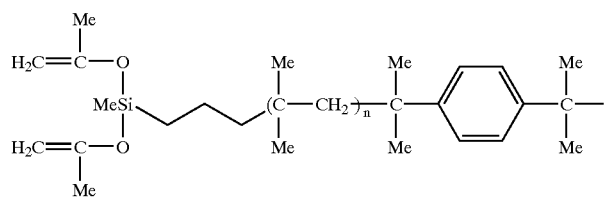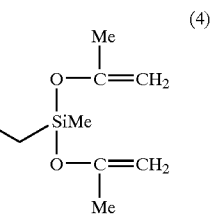

(4)

TABLE 1

|  | CE1 | E1 | CE2 | E2 | CE3 | E3 |
|---|---|---|---|---|---|---|
| Hardness, Duro-A | UM | 16 | UM | 20 | UM | 10 |
| Elongation at break, % | UM | 540 | UM | 600 | UM | 1050 |
| Tensile strength, MPa | UM | 0.92 | UM | 1.4 | UM | 1.2 |

UM: unmeasurable

There has been described a room temperature curable composition of the condensation curing type based on a saturated hydrocarbon polymer and having improved fast and deep curing capabilities.

Japanese Patent Application No. 2001-034340 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable composition comprising
   (A) 100 parts by weight of a saturated hydrocarbon polymer having a number average molecular weight in the range of 500 to 50,000 and bearing at least two hydrolyzable silyl groups at an end of the backbone and/or an end of a side chain per molecule,
   (B) an organic compound having at least one C=O group in a molecule, in such an amount as to give 0.001 to 1 mol of the C=O group per 100 parts by weight of polymer (A),
   (C) an organic compound having at least one NH2 group in a molecule, in such an amount as to give 0.001 to 1 mol of the $NH_2$ group per 100 parts by weight of polymer (A), components (B) and (C) being selected such that the C=O and $NH_2$ groups in the respective components are reactive with each other, and (D) a paraffinic process oil
   wherein polymer (A) is a structure of the general formula (2)

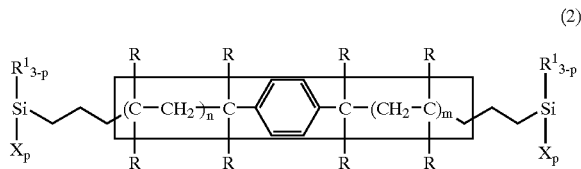

wherein R and $R^1$, which may be the same or different, are substituted or unsubstituted monovalent hydrocarbon groups, X is a hydrolyzable group, p is an integer of 1 to 3, and m and n are positive integers.

2. The composition of claim 1 wherein polymer (A) has in its backbone a structure of the following general formula (1):

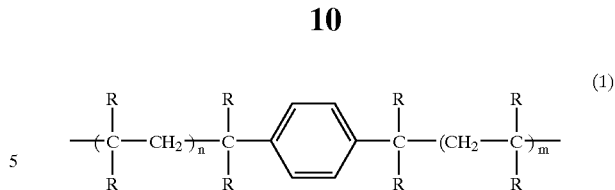

wherein R is independently a substituted or unsubstituted monovalent hydrocarbon group, m and n are positive integers such that polymer (A) has a number average molecular weight in the range of 500 to 50,000.

3. The composition of claim 1, wherein X is selected from the group consisting of carboxyl, ketoxime, alkoxy, alkenoxy, amino, aminoxy, and amide groups.

4. The composition of claim 1, wherein $R^1$ is selected from the group consisting of methyl, ethyl, propyl, cycloalkyl, alkenyl, and aryl.

5. The composition of claim 1 wherein the organic compound having at least one C=O group (B) is selected from the group consisting of a ketone, ethyl acetate, butyl acetate, methyl propionate, ethyl acrylate, butyrolactone, dimethylformamide, diethylacetamide, butyrolactam, acetic acid, propionic acid, benzoic acid, silane coupling agents having at least one C=O group, and oligomers and polymers having at least one C=O group.

6. The composition of claim 5, wherein the organic compound having at least one C=O group (B) is a ketone selected from the group consisting of acetone, methyl ethyl ketone, and acetophenone.

7. The composition of claim 1, wherein the organic compound having at least one $NH_2$ group (C) is selected from the group consisting of methylamine, ethylamine, butylamine, ethylenediamine, aniline, a silane coupling agent having $NH_2$ groups, oligomers having $NH_2$ groups, and polymers having $NH_2$ groups.

8. The composition of claim 7, wherein the organic compound having at least one $NH_2$ group (C) is γ-aminopropyltriethoxysilane.

* * * * *